US012401576B2

(12) United States Patent
Yang

(10) Patent No.: US 12,401,576 B2
(45) Date of Patent: Aug. 26, 2025

(54) VIRTUAL RESOURCE INFORMATION SYNCHRONIZATION METHOD, ORCHESTRATOR, ELECTRONIC DEVICE, AND READABLE STORAGE MEDIUM

(71) Applicant: ZTE CORPORATION, Guangdong (CN)

(72) Inventor: Song Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 39 days.

(21) Appl. No.: 18/697,465

(22) PCT Filed: Sep. 28, 2022

(86) PCT No.: PCT/CN2022/122029
§ 371 (c)(1),
(2) Date: Mar. 30, 2024

(87) PCT Pub. No.: WO2023/051582
PCT Pub. Date: Apr. 6, 2023

(65) Prior Publication Data
US 2024/0406077 A1 Dec. 5, 2024

(30) Foreign Application Priority Data
Sep. 30, 2021 (CN) .......................... 202111159309.1

(51) Int. Cl.
G06F 15/173 (2006.01)
G06F 9/50 (2006.01)
(Continued)

(52) U.S. Cl.
CPC ............ H04L 41/40 (2022.05); G06F 9/5077 (2013.01); H04L 41/0894 (2022.05); H04L 41/5022 (2013.01)

(58) Field of Classification Search
CPC . H04L 41/40; H04L 41/0894; H04L 41/5022; G06F 9/5077
See application file for complete search history.

(56) References Cited

U.S. PATENT DOCUMENTS

| 8,468,251 | B1* | 6/2013 | Pijewski | G06F 9/5072 709/215 |
| 2014/0188532 | A1* | 7/2014 | Liu | G06F 9/5083 705/7.12 |
| 2020/0322453 | A1 | 10/2020 | Said | |

FOREIGN PATENT DOCUMENTS

| CN | 108282501 A | 7/2018 |
| CN | 109416651 A | 3/2019 |

(Continued)

OTHER PUBLICATIONS

WIPO, International Search Report issued on Dec. 16, 2022.
(Continued)

Primary Examiner — Joseph R Maniwang
(74) Attorney, Agent, or Firm — Li & Cai Intellectual Property (USA) Office

(57) ABSTRACT

The present disclosure provides a method for synchronizing virtual resource information, including: determining a resource synchronization policy characterizing a priority level of at least one tenant, wherein synchronization frequencies for synchronizing virtual resource information of tenants corresponding to different priority levels are different; and synchronizing virtual resource information of the at least one tenant according to the resource synchronization policy. The present disclosure further provides an orchestrator, an electronic device, and a non-transitory computer-readable storage medium.

20 Claims, 6 Drawing Sheets

(51) Int. Cl.
      *H04L 41/0894*    (2022.01)
      *H04L 41/40*    (2022.01)
      *H04L 41/5022*    (2022.01)

(56) References Cited

FOREIGN PATENT DOCUMENTS

| CN | 109783225 A | 5/2019 |
| CN | 112182100 A | 1/2021 |
| CN | 108282501 B | 3/2021 |
| WO | WO2017114199 A1 | 7/2017 |
| WO | WO2020253266 A1 | 12/2020 |

OTHER PUBLICATIONS

European Patent Office, the Extended European Search Report dated Nov. 22, 2024, for corresponding EP application No. 22874967.7.

* cited by examiner (a)

(b)

VIRTUAL RESOURCE INFORMATION SYNCHRONIZATION METHOD, ORCHESTRATOR, ELECTRONIC DEVICE, AND READABLE STORAGE MEDIUM

CROSS REFERENCE TO RELATED APPLICATIONS

This application is a National Phase Application filed under 35 U.S.C. 371 as a national stage of PCT/CN2022/122029, filed on Sep. 28, 2022, an application claiming claims the priority to Chinese Patent Application No. 202111159309.1 filed on Sep. 30, 2021, the contents of which are incorporated herein by reference in their entirety.

TECHNICAL FIELD

The present disclosure relates to the field of computer technology, and in particular, to a method for synchronizing virtual resource information, an orchestrator, an electronic device, and a non-transitory computer-readable storage medium.

BACKGROUND

In the field of virtualization, a Management and Orchestration (MANO system) system usually corresponds to a plurality of cloud platforms, and the MANO system is responsible for managing virtual resources of Virtual Network Functions (VNFs) on the cloud platforms. In order to achieve the management of the VNFs, the MANO system needs to perceive changes of the virtual resources on each cloud platform.

In some related technologies, the MANO system has a great limitation in support and management of the VNFs.

SUMMARY

Embodiments of the present disclosure provide a method for synchronizing virtual resource information, an orchestrator, an electronic device, and a non-transitory computer-readable storage medium.

In a first aspect, an embodiment of the present disclosure provides a method for synchronizing virtual resource information, including: determining a resource synchronization policy characterizing a priority level of at least one tenant, wherein synchronization frequencies for synchronizing virtual resource information of tenants corresponding to different priority levels are different; and synchronizing virtual resource information of the at least one tenant according to the resource synchronization policy.

In a second aspect, an embodiment of the present disclosure provides an orchestrator, including: one or more processors; a memory having stored thereon one or more programs which, when executed by the one or more processors, cause the one or more processors to perform the method for synchronizing virtual resource information described in the first aspect of the embodiments of the present disclosure; and one or more input/output (I/O) interfaces connected between the one or more processors and the memory and configured to enable information interaction between the one or more processors and the memory.

In a third aspect, an embodiment of the present disclosure provides an electronic device, including: one or more processors; a memory having stored thereon one or more programs which, when executed by the one or more processors, cause the one or more processors to perform the method for synchronizing virtual resource information described in the first aspect of the embodiments of the present disclosure; and one or more I/O interfaces connected between the one or more processors and the memory and configured to enable information interaction between the one or more processors and the memory.

In a fourth aspect, an embodiment of the present disclosure provides a non-transitory computer-readable storage medium having stored thereon a computer program which, when executed by a processor, implements the method for synchronizing virtual resource information described in the first aspect of the embodiments of the present disclosure.

DETAIL DESCRIPTION OF EMBODIMENTS

Figure 1:
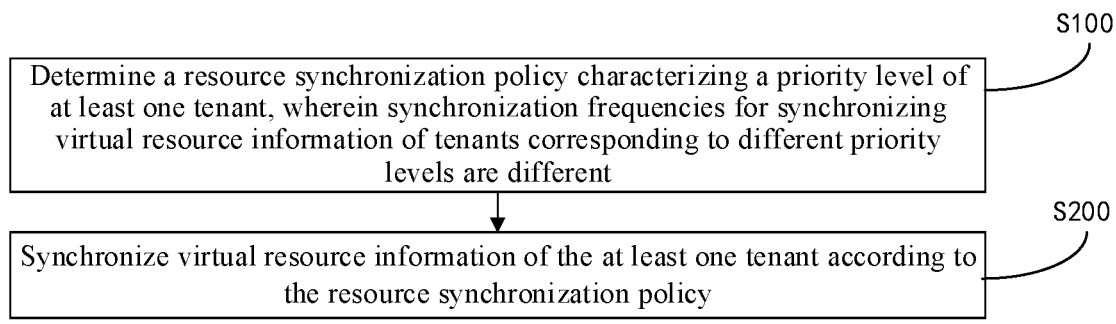
FIG. 1 is a flowchart illustrating a method for synchronizing virtual resource information according to an embodiment of the present disclosure.

In order to enable those of ordinary skill in the art to better understand the technical solutions of the present disclosure, a method for synchronizing virtual resource information, an orchestrator, an electronic device, and a non-transitory computer-readable storage medium provided by the present disclosure are described in detail below with reference to the drawings.

Exemplary embodiments of the present disclosure will be described more fully below with reference to the drawings, but the exemplary embodiments described herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

The embodiments described herein and the features therein can be combined with one another if no conflict is caused.

The term "and/or" used herein includes any and all combinations of one or more associated listed items.

The terms used herein are merely used to describe specific embodiments, and are not intended to limit the present disclosure. As used herein, "a" and "the" which indicate a singular form are intended to include the plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

The VNFs manage the virtual resources through the MANO system. A series of operation and maintenance actions such as deployment or capacity adjustment to virtual machines and operations on related network resources all need to be initiated from the MANO system. In order to enable the MANO system to better serve the VNFs and take appropriate measures for the VNF-initiated operations on the resources, the MANO system needs to know attributes and states of the virtual resources related to the VNFs. For example, a user wishes to migrate a virtual machine under a certain VNF from a host node A to a host node B, but before the user operates the virtual machine to migrate, the virtual machine may have been in a migration process or have been migrated to the host node B due to some other external reasons (e.g., host maintenance, manual operation, etc.) If the MANO system cannot perceive changes of attributes and states of the virtual resources related to the virtual machine, the MANO system cannot take appropriate operation measures, and thus cannot support the resource operation of the user well.

In order to solve the above problem, in some related technologies, there is a virtual resource management module or component in the MANO system. The module or component generally interacts with each cloud platform at a fixed frequency to perceive the changes of the virtual resources on the cloud platforms.

It is found through research by inventors of the present disclosure that the policy of interacting with each cloud platform at a fixed frequency has a great limitation. Specifically, the policy of synchronizing information at the fixed frequency often leads to a result that, in the worst case, the MANO system needs to wait for a complete synchronization cycle before perceiving the changes of the attributes and the states of the virtual resources, and such lagging often causes unpredictable errors. For example, in a case where the virtual machine has already been in the migration process, if the MANO system fails to timely perceive the changes of the attributes and the states of the virtual resources related to the virtual machine because the MANO system needs to wait for the synchronization cycle to complete, when the user wishes to migrate the virtual machine from the host node A to the host node B, the user will still issue a migration request through the MANO system, and after receiving the migration request, the cloud platform may return an error such as an operation conflict which may confuses the user.

In some related technologies, timeliness of the perception of the changes of the attributes and the states of the virtual resources by the MANO system is improved by increasing a synchronization frequency. The inventors of the present disclosure found that increasing the synchronization frequency is costly. Specifically, since the MANO system has limited resources, increasing the synchronization frequency means more resource consumption, which may affect normal lifecycle services; meanwhile, since the MANO system and the cloud platforms are in a one-to-many relationship, if a certain cloud platform among a plurality of cloud platforms has a temporary performance bottleneck, the response of the cloud platform may become slow, and interacting with the cloud platform at a high frequency may further worsen the performance problem of the cloud platform. Therefore, the solution of improving the timeliness of the perception of the changes of the attributes and the states of the virtual resources by the MANO system by increasing the synchronization frequency is not a superior solution.

In view of the above, in a first aspect, referring to FIG. 1, an embodiment of the present disclosure provides a method for synchronizing virtual resource information, which includes the following operations S100 and S200.

In operation S100, determining a resource synchronization policy characterizing a priority level of at least one tenant, wherein synchronization frequencies for synchronizing virtual resource information of tenants corresponding to different priority levels are different.

In operation S200, synchronizing virtual resource information of the at least one tenant according to the resource synchronization policy.

In the embodiments of the present disclosure, a cloud platform is divided by tenants, and each cloud platform is regarded as a collection of tenants. It should be noted that, in the embodiments of the present disclosure, virtual resources of all the tenants on one cloud platform may be managed by the same MANO system, or virtual resources of part of the tenants on one cloud platform may be managed by the same MANO system, which is not particularly limited in the embodiments of the present disclosure. The at least one tenant in operation S100 belongs to at least one cloud platform, and the at least one tenant in operation S100 is managed by the same MANO system. In operation S200, synchronization of virtual resource information is performed on a tenant basis (taking a tenant as a unit).

Figure 2:
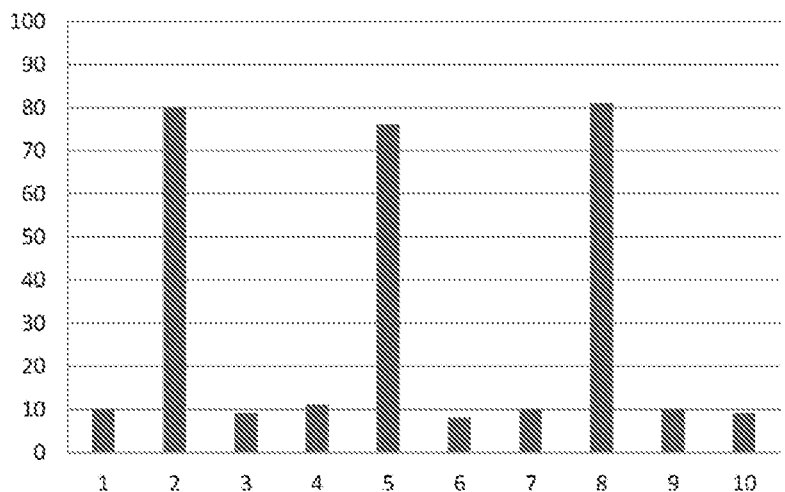
FIG. 2 is a schematic diagram illustrating resource consumption of virtual resource information synchronization.
Figure 2:
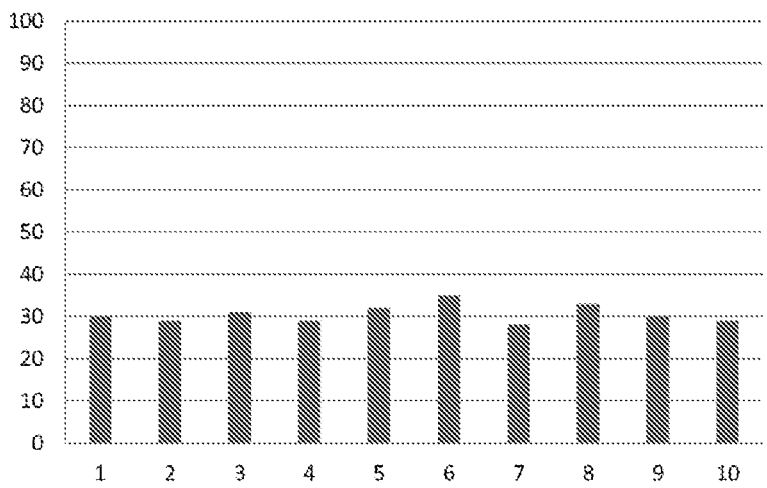

FIG. 2 (a) is a schematic diagram of resource consumption when performing virtual resource information synchronization on a cloud platform basis (taking a cloud platform as a unit), and FIG. 2 (b) is a schematic diagram of resource consumption when performing virtual resource information synchronization on the tenant basis. As shown in FIG. 2, in the embodiments of the present disclosure, by performing virtual resource information synchronization on the tenant basis, the scale of virtual resource information synchronization is reduced from a cloud-platform level to a tenant level, so that the resource consumption of the MANO system is changed from single-time-point burst-type consumption to full-time smooth consumption.

It should be noted that, in the embodiment of the present disclosure, by determining the resource synchronization policy in operation S100, the priority level corresponding to each tenant is made dynamically adjustable. In operation S200, the virtual resource information of the tenant is synchronized according to the resource synchronization policy, that is, the virtual resource information is synchronized from the cloud platform(s) to which the respective tenants belong according to the synchronization frequency corresponding to the priority level of each tenant. The synchronization frequencies corresponding to the tenants with different priority levels are different, so that the virtual resource information of different tenants can be synchronized at differentiated synchronization frequencies. The priority level of a single tenant can be dynamically changed. Typically, but not necessarily, the higher the priority level of the tenant is, the higher the corresponding synchronization frequency is.

With the method for synchronizing virtual resource information provided in the embodiment of the present disclosure, by synchronizing the virtual resource information on a tenant basis, the resource consumption of the MANO system is changed to a smooth consumption, and an influence of the virtual resource information synchronization on normal life-cycle services of the MANO system is reduced; and with the synchronization frequencies of different tenants being independent of each other and dynamically adjustable, the MANO system can synchronize the virtual resource information of the tenants in a differentiated way according to factors such as performance of the cloud platforms, user operations, and the like, which facilitates improving the timeliness of virtual resource synchronization and reducing an influence on the performance of the cloud platforms, thereby better supporting resource operations of the user in the VNFs.

In some embodiments, user operations targeting a tenant are predicted, and the priority level of the tenant is determined according to the predicted user operations, thereby a synchronization frequency capable of meeting requirements of a subsequent VNF service can be determined. For example, significant operations targeting a tenant, such as deployment/upgrading/capacity adjustment of virtual machines, are predicted. When it is predicted that a user may possibly execute operations such as deployment/upgrading/capacity adjustment of the virtual machines targeting a tenant, the frequency for synchronizing the virtual resource information of the tenant is increased to synchronize the virtual resource information of the tenant in time, so that the changes of the attributes and the states of the virtual resources caused by the operations such as the deployment/upgrading/capacity adjustment of the virtual machines can be perceived in time, and therefore the problems such as operation conflict caused by untimely synchronization can be avoided in the subsequent VNF services.

Figure 3:
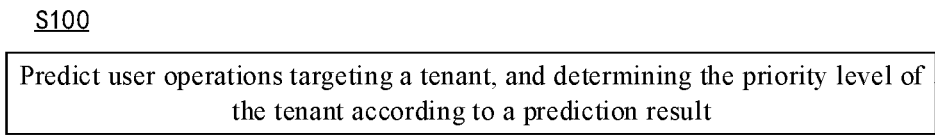
FIG. 3 is another flowchart illustrating some operations in a method for synchronizing virtual resource information according to an embodiment of the present disclosure.

Accordingly, in some embodiments, referring to FIG. 3, determining the resource synchronization policy in operation S100 may further include the following operation S110.

In operation S110, predicting user operations targeting a tenant, and determining the priority level of the tenant according to a prediction result.

The user operations are not particularly limited in the embodiments of the present disclosure. In some embodiments, the user operations are operations capable of greatly changing the attributes and the states of the virtual resources of the tenant, such as deployment, upgrading, capacity adjustment or migration of the virtual machines of the tenant.

How to predict the user operations is not particularly limited in the embodiments of the present disclosure.

It is found through research by the inventors of the present disclosure that in actual application scenarios, each VNF belongs to a different tenant; in the actual application scenarios, MANO services corresponding to signification operations such as deployment, upgrading, and capacity adjustment of virtual machines are usually executed in series according to on-site time planning, that is, the user operations of each VNF are executed in series and do not conflict with each other in time, and there is little probability of executing signification operations concurrently; before the signification operations such as the deployment, upgrading, and capacity adjustment of the virtual machines are executed, an inspection on the current environmental situation usually needs to be carried out, the inspection includes confirming states of related virtual resources, and the VNFs may trigger queries about the virtual resource information of the tenants in the inspection process; and after the user operations are completed, in order to ensure that an expected VNF resource state is reached, queries about the virtual resource information of the tenants of the VNFs are also triggered.

Based on the above research, in the embodiments of the present disclosure, the prediction of user operations may be performed according to a frequency of queries of a VNF about the virtual resources of the tenant. For example, if a VNF actively requests queries about the virtual resource information of a certain tenant of a certain cloud platform, the higher the frequency of the queries is, the higher the possibility of significant operations on the tenant such as deployment, upgrading, migration, and capacity adjustment of virtual machines is. Therefore, it is determined that the priority level of the tenant needs to be increased to meet requirements of subsequent services of the VNF.

Figure 4:
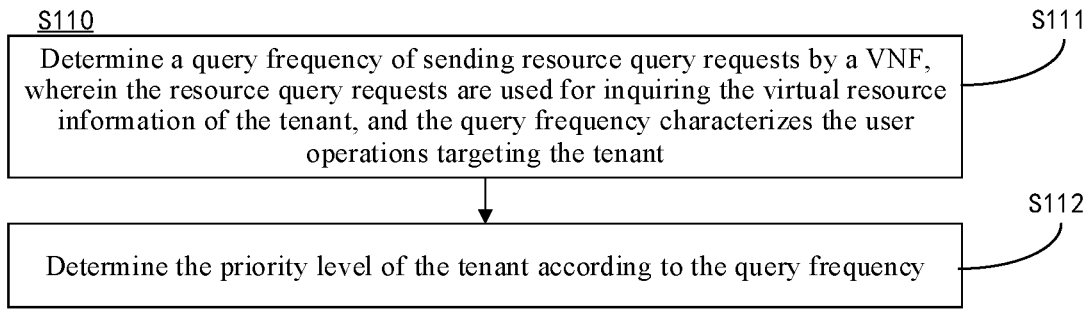
FIG. 4 is still another flowchart illustrating some operations in a method for synchronizing virtual resource information according to an embodiment of the present disclosure.

Accordingly, in some embodiments, referring to FIG. 4, predicting the user operations targeting the tenant, and determining the priority level of the tenant according to the prediction result in operation S110 may further include the following operations S111 and S112.

In operation S111, determining a query frequency of sending resource query requests by a Virtual Network Function (VNF), wherein the resource query requests are used for inquiring the virtual resource information of the tenant, and the query frequency characterizes the user operations targeting the tenant.

In operation S112, determining the priority level of the tenant according to the query frequency.

How to determine the query frequency is not particularly limited in the embodiments of the present disclosure. In some embodiments, it is possible to determine the number of times of inquiring the virtual resource information of the tenant within a certain time interval, and thereby determine the query frequency.

How to determine the priority level of the tenant according to the query frequency is not particularly limited in the embodiments of the present disclosure.

Figure 5:
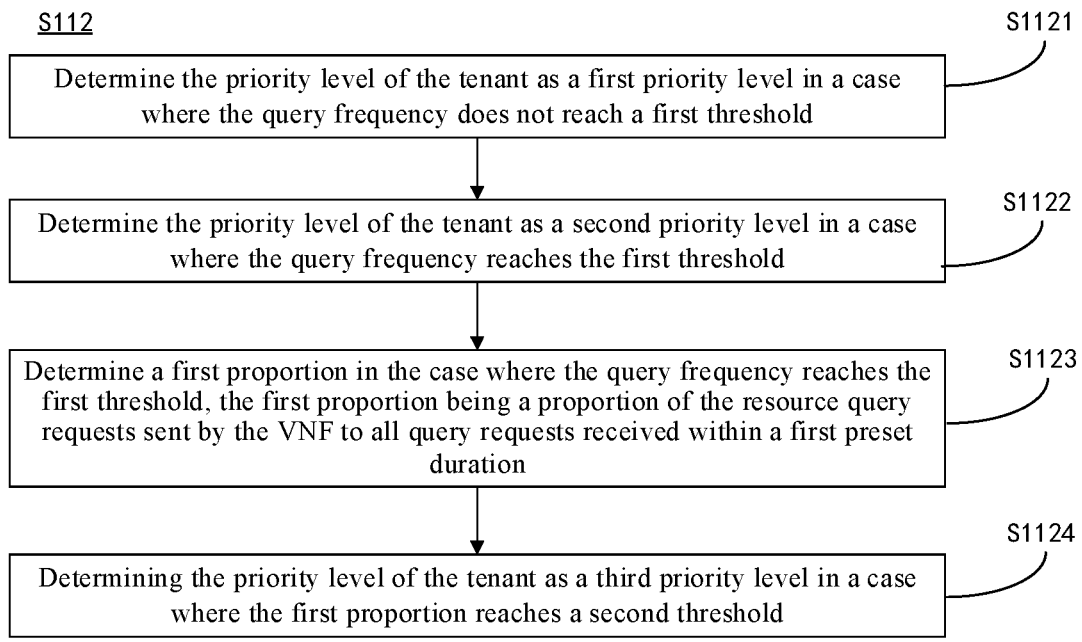
FIG. 5 is yet another flowchart illustrating some operations in a method for synchronizing virtual resource information according to an embodiment of the present disclosure.

Accordingly, in some embodiments, referring to FIG. 5, determining the priority level of the tenant according to the query frequency in operation S112 may further include the following operations S1121 and S1122.

In operation S1121, determining the priority level of the tenant as a first priority level in a case where the query frequency does not reach a first threshold.

In operation S1122, determining the priority level of the tenant as a second priority level in a case where the query frequency reaches the first threshold.

Herein, synchronization frequency corresponding to the first priority level is lower than that corresponding to the second priority level.

In some embodiments, the priority level of each tenant is initially an ordinary level, so the first priority level is the ordinary level, the second level is a higher priority level, and the synchronization frequency corresponding to the ordinary level is lower than that corresponding to the higher priority level.

Accordingly, in some embodiments, referring to FIG. 5, determining the priority level of the tenant according to the query frequency in operation S112 may further include the following operations S1123 and S1124.

In operation S1123, determining a first proportion in the case where the query frequency reaches the first threshold, the first proportion being a proportion of the resource query requests sent by the VNF to all query requests received within a first preset duration.

In operation S1124, determining the priority level of the tenant as a third priority level in a case where the first proportion reaches a second threshold, wherein the synchronization frequency corresponding to the second priority level is lower than that corresponding to the third priority level.

In some embodiments, the third priority level is the highest level, and the synchronization frequency corresponding thereto is the maximum synchronization frequency. In some embodiments, when the priority level of the tenant is the third priority level, a synchronization task of synchronizing the virtual resource information of the tenant is immediately performed.

In the embodiments of the present disclosure, a prediction function for the prediction of the user operations may be a default prediction function in the MANO system or an externally injected prediction function, which is not particularly limited in the embodiments of the present disclosure.

Figure 6:
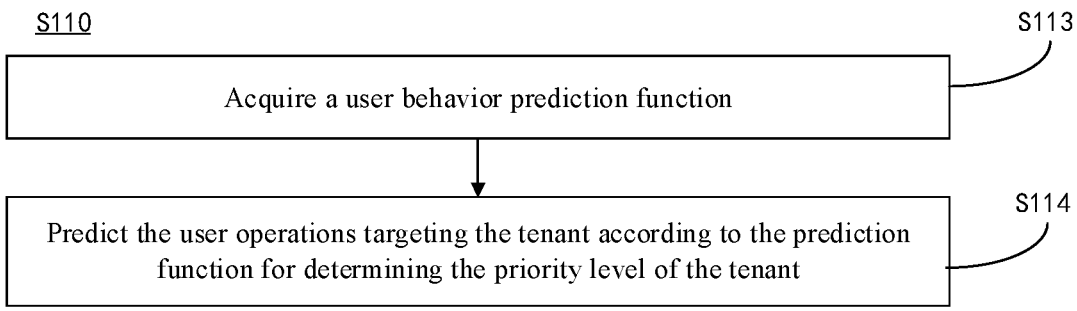
FIG. 6 is yet another flowchart illustrating some operations in a method for synchronizing virtual resource information according to an embodiment of the present disclosure.

Accordingly, in some embodiments, referring to FIG. 6, predicting the user operations targeting the tenant, and determining the priority level of the tenant according to the prediction result in operation S110 may further include the following operations S113 and S114.

In operation S113, acquiring a user behavior prediction function.

In operation S114, predicting the user operations targeting the tenant according to the prediction function for determining the priority level of the tenant.

In some embodiments, when determining the priority level of the tenant according to the query frequency of inquiring the virtual resource information of the tenant by the VNF, acquiring the externally injected prediction function means acquiring externally configured parameters such as the first threshold and the second threshold.

In some embodiments, the priority levels of the tenants belonging to a cloud platform are dynamically adjusted according to performance of the cloud platform, and then the synchronization frequencies corresponding to the tenants belonging to the cloud platform are accordingly adjusted. In the embodiments of the present disclosure, the performance of the cloud platform is characterized according to a response capability of the cloud platform.

Figure 7:
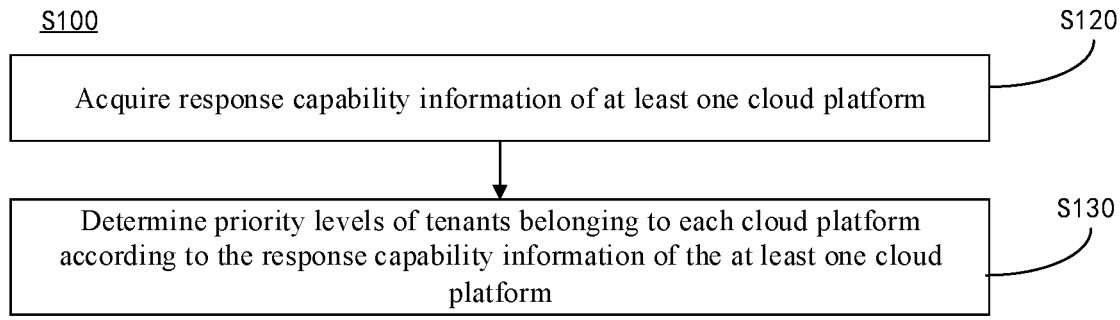
FIG. 7 is yet another flowchart illustrating some operations in a method for synchronizing virtual resource information according to an embodiment of the present disclosure.

Accordingly, in some embodiments, referring to FIG. 7, determining the resource synchronization policy in operation S100 may further include the following operations S120 and S130.

In operation S120, acquiring response capability information of at least one cloud platform.

In operation S130, determining priority levels of tenants belonging to each cloud platform according to the response capability information of the at least one cloud platform.

In the embodiments of the present disclosure, when a response capability of a cloud platform is reduced due to a performance bottleneck of the cloud platform, the priority levels of the tenants belonging to the cloud platform are adjusted to a priority level corresponding to the lower synchronization frequency, so that the frequencies for synchronizing the virtual resource information of the tenants are differentiated according to the response capability of the cloud platform, thereby alleviating the problem of the performance bottleneck of the cloud platform.

How to acquire the response capability of the cloud platform is not particularly limited in the embodiments of the present disclosure.

Figure 8:
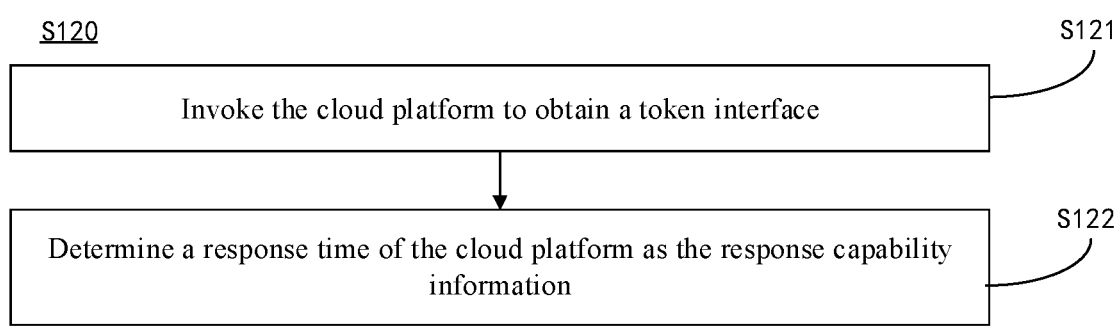
FIG. 8 is yet another flowchart illustrating some operations in a method for synchronizing virtual resource information according to an embodiment of the present disclosure.

In some embodiments, referring to FIG. 8, acquiring response capability information of at least one cloud platform in operation S120 may further include the following operations S121 and S122.

In operation S121, invoking (calling) the cloud platform to obtain a token interface.

In operation S122, determining a response time of the cloud platform as the response capability information.

How to determine the response time of the cloud platform is not particularly limited in the embodiments of the present disclosure.

Figure 9:
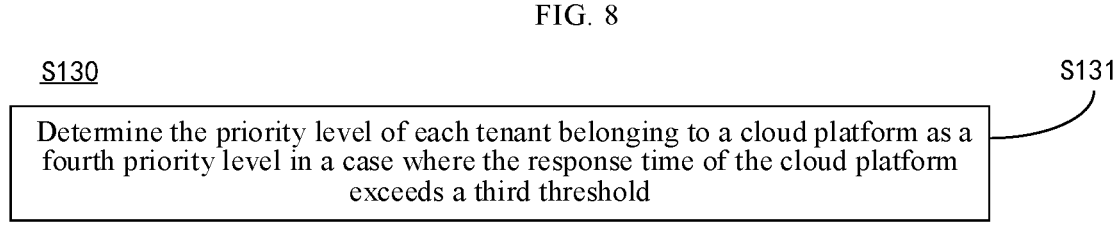
FIG. 9 is yet another flowchart illustrating some operations in a method for synchronizing virtual resource information according to an embodiment of the present disclosure.

In some embodiments, referring to FIG. 9, determining the priority levels of the tenants belonging to each cloud platform according to the response capability information of the at least one cloud platform may further include the following operation S131.

In operation S131, determining the priority level of each tenant belonging to a cloud platform as a fourth priority level in a case where the response time of the cloud platform exceeds a third threshold, wherein a synchronization frequency corresponding to the fourth priority level is lower than an original synchronization frequency of each tenant.

How to perform the operation S131 is not particularly limited in the embodiments of the present disclosure. For example, it is possible to set the fourth priority level to correspond to a specific synchronization frequency which is the minimum synchronization frequency; and it is also possible to set the frequency of the tenants with the fourth priority level to be reduced by a predetermined ratio, for example, the synchronization frequency corresponding to the fourth priority level may be set to half of the original synchronization frequency.

In some embodiments, effectiveness of the resource synchronization policy may also be evaluated, and the resource synchronization policy may be updated when the effectiveness of the resource synchronization policy does not meet a requirement, thereby producing a closed-loop effect.

Figure 10:
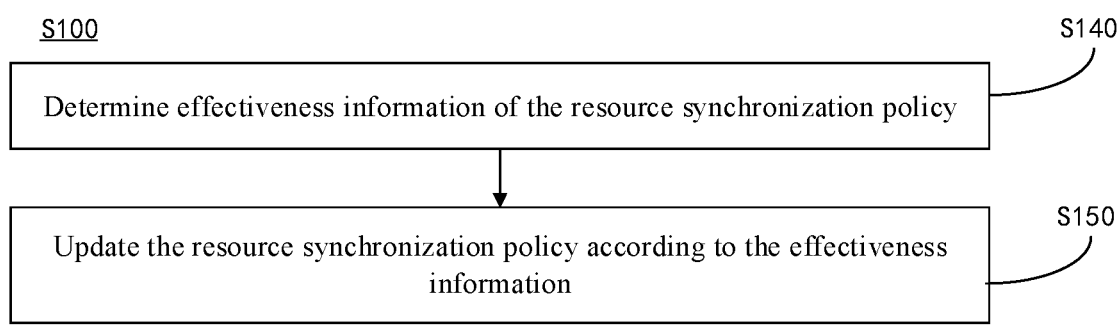
FIG. 10 is yet another flowchart illustrating some operations in a method for synchronizing virtual resource information according to an embodiment of the present disclosure.

Accordingly, in some embodiments, referring to FIG. 10, determining the resource synchronization policy in operation S100 may further include the following operations S140 and S150.

In operation S140, determining effectiveness information of the resource synchronization policy.

In operation S150, updating the resource synchronization policy according to the effectiveness information.

Figure 11:
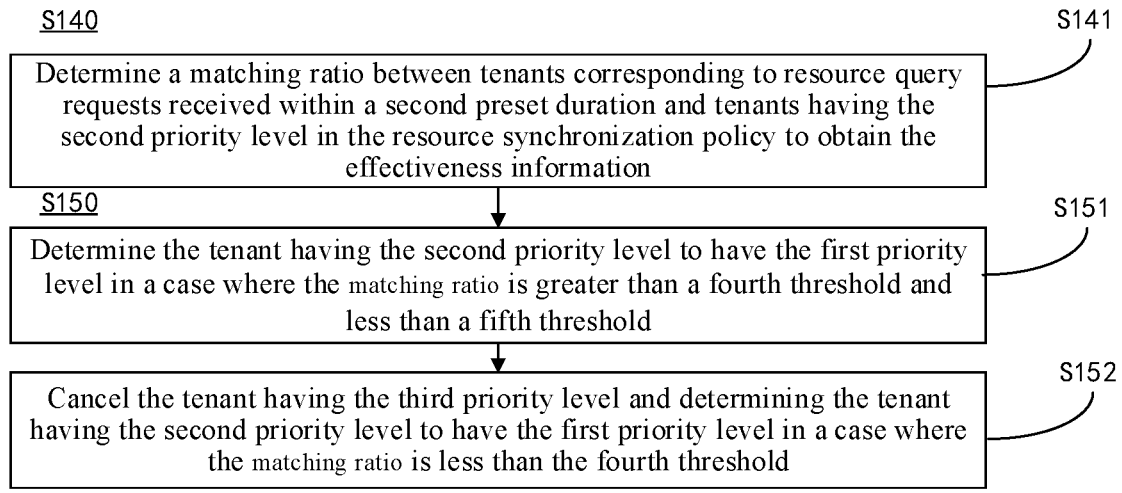
FIG. 11 is yet another flowchart illustrating some operations in a method for synchronizing virtual resource information according to an embodiment of the present disclosure.

In some embodiments, referring to FIG. 11, determining the effectiveness information of the resource synchronization policy in operation S140 may include the following operation S141.

In operation S141, determining a matching ratio (coincidence rate) between tenants corresponding to resource query requests received within a second preset duration and tenants having the second priority level in the resource synchronization policy, so as to obtain the effectiveness information, with the synchronization frequency corresponding to the first priority level being lower than that corresponding to the second priority level, and the synchronization frequency corresponding to the second priority level being lower than that corresponding to the third priority level.

In some embodiments, referring to FIG. 11, updating the resource synchronization policy according to the effectiveness information in operation S150 may further include the following operations S151 and S152.

In operation S151, determining the tenant having the second priority level to have the first priority level in a case where the matching ratio is greater than a fourth threshold and less than a fifth threshold.

In operation S152, cancelling the tenant having the third priority level and determining the tenant having the second priority level to have the first priority level in a case where the matching ratio is less than the fourth threshold.

In some embodiments, in a case where the matching ratio is greater than the fifth threshold, the resource synchronization policy is determined as being effective.

Figure 12:
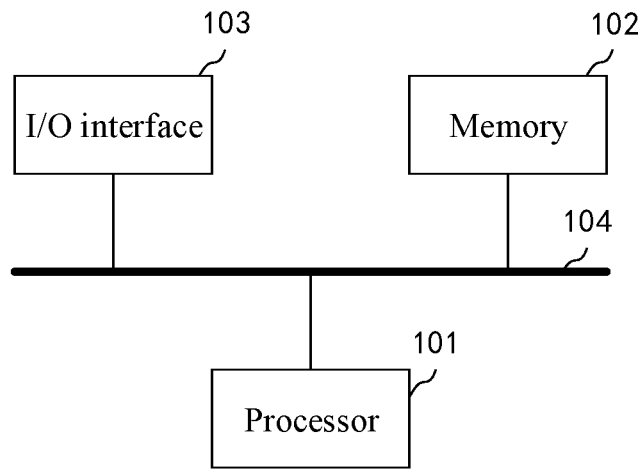
FIG. 12 is a block diagram of an orchestrator according to an embodiment of the present disclosure.

In a second aspect, referring to FIG. 12, an embodiment of the present disclosure further provides an orchestrator, including: one or more processors 101; a memory 102 having stored thereon one or more programs which, when executed by the one or more processors, cause the one or more processors to perform the method for synchronizing virtual resource information described in the first aspect of the embodiments of the present disclosure; and one or more input/output (I/O) interfaces 103 connected between the one or more processors and the memory and configured to enable information interaction between the one or more processors and the memory.

The processor 101 is a device having data processing capability, and includes, but is not limited to, a Central Processing Unit (CPU); the memory 102 is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and the I/O interface (read/write interface) 103 is connected between the processor 101 and the memory 102, is capable of enabling the information interaction between the processor 101 and the memory 102, and includes, but is not limited to, a data bus (Bus).

In some embodiments, the processor 101, the memory 102, and the I/O interface 103 are connected to each other through a bus 104, and then are connected to other components of a computing device.

Figure 13:
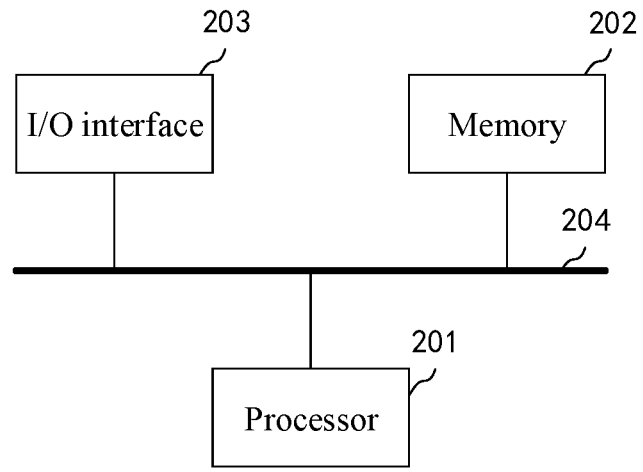
FIG. 13 is a block diagram of an electronic device according to an embodiment of the present disclosure.

In a third aspect, referring to FIG. 13, an embodiment of the present disclosure further provides an electronic device, including: one or more processors 201; a memory 202 having stored thereon one or more programs which, when executed by the one or more processors, cause the one or more processors to perform the method for synchronizing virtual resource information described in the first aspect of the embodiments of the present disclosure; and one or more I/O interfaces 203 connected between the one or more processors and the memory and configured to enable information interaction between the one or more processors and the memory.

The processor 201 is a device having data processing capability, and includes, but is not limited to, a CPU; the memory 202 is a device having data storage capability, and includes, but is not limited to, an RAM (more specifically, an SDRAM, a DDR SDRAM, etc.), an ROM, an EEPROM, and a FLASH; and the I/O interface (read/write interface) 203 is connected between the processor 201 and the memory 202, is capable of enabling the information interaction between the processor 201 and the memory 202, and includes, but is not limited to, a data bus (Bus).

In some embodiments, the processor 201, the memory 202, and the I/O interface 203 are connected to each other through a bus 204, and then are connected to other components of a computing device.

Figure 14:
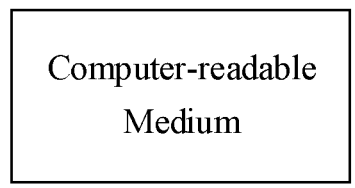
FIG. 14 is a block diagram of a computer-readable storage medium according to an embodiment of the present disclosure.

In a fourth aspect, referring to FIG. 14, an embodiment of the present disclosure further provides a non-transitory computer-readable storage medium having stored thereon a computer program which, when executed by a processor, implements the method for synchronizing virtual resource information described in the first aspect of the embodiments of the present disclosure.

In order to enable those of ordinary skill in the art to understand the technical solutions provided in the embodiments of the present disclosure more clearly, the technical solutions provided in the embodiments of the present disclosure are illustrated in detail below by a specific embodiment.

Embodiment

In this embodiment, the MANO system operates normally, and communication between the MANO system and the cloud platforms is normal.

Figure 15:
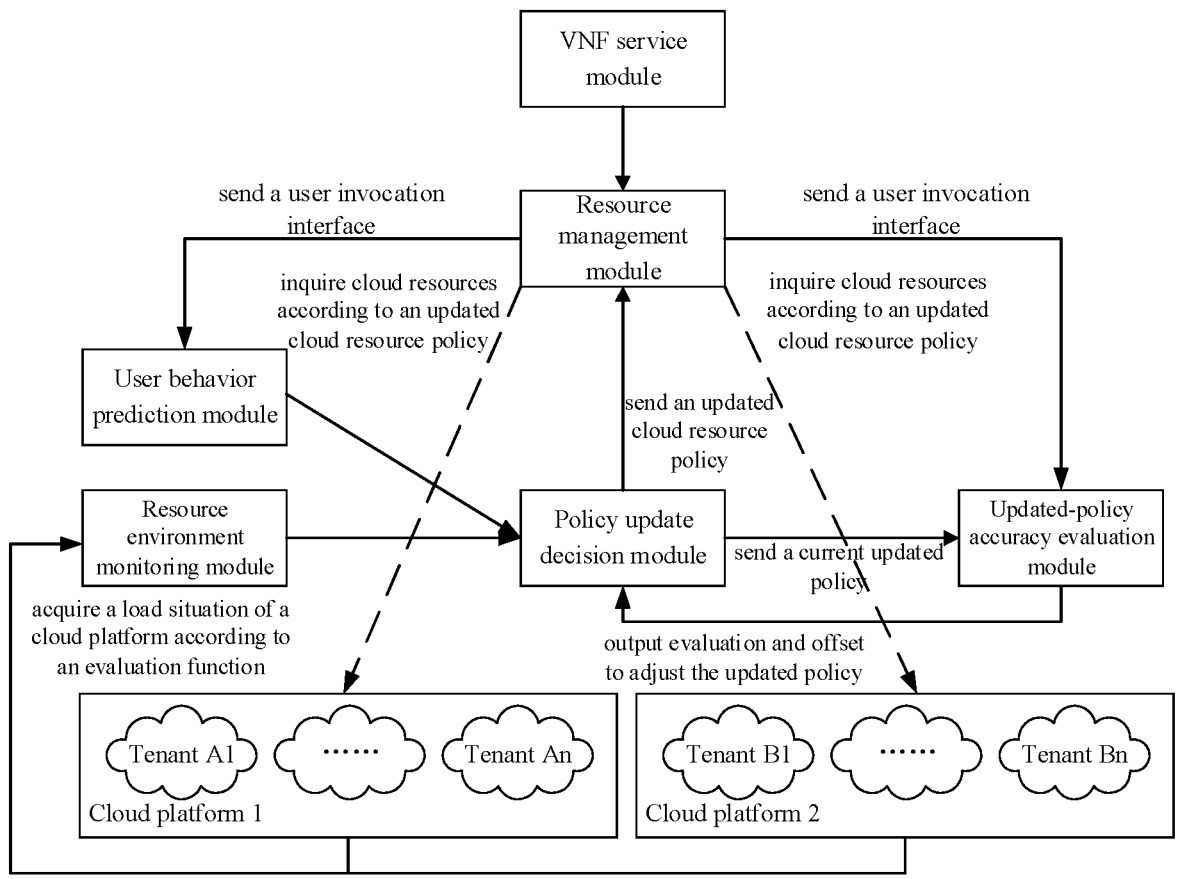
FIG. 15 is a schematic diagram of architecture for virtual resource information synchronization according to an embodiment of the present disclosure.

FIG. 15 is a schematic diagram of an architecture for virtual resource information synchronization according to this embodiment. As shown in FIG. 15, the architecture for virtual resource information synchronization includes a VNF service module, a resource management module, a behavior prediction module, a resource environment monitoring module, a policy update decision module, and an updated-policy accuracy evaluation module.

Figure 16:
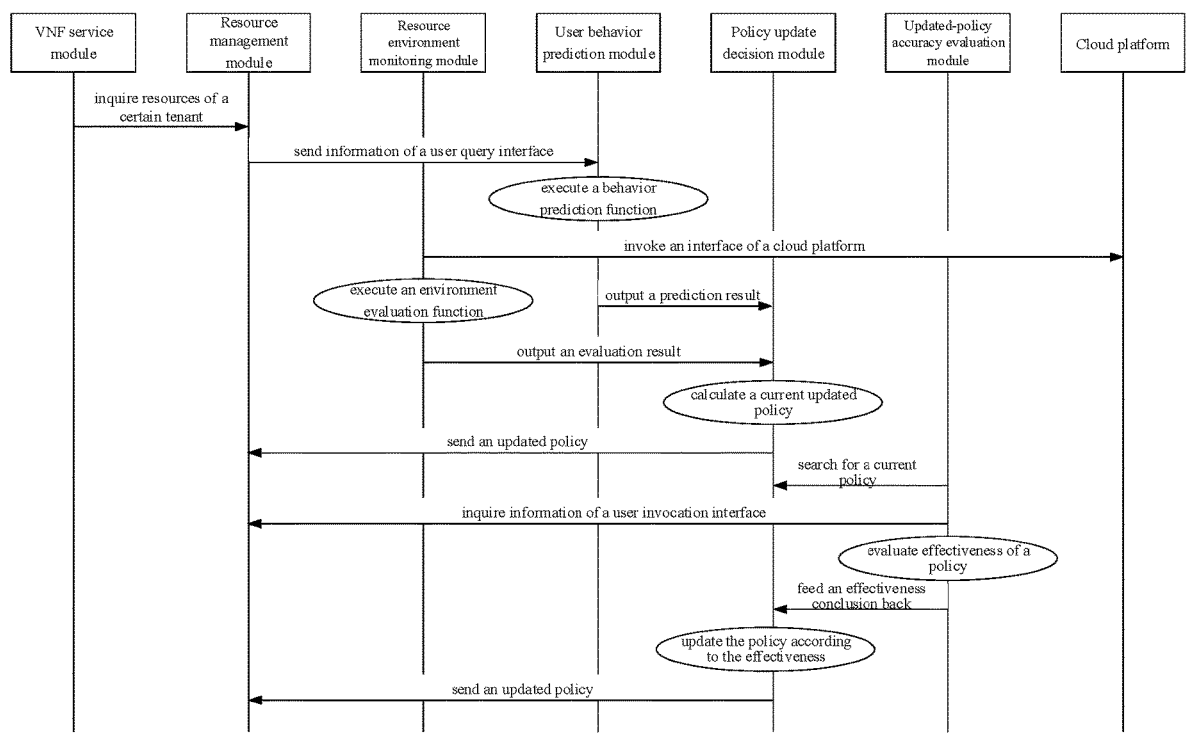
FIG. 16 is a schematic diagram illustrating interaction between service modules in architecture for virtual resource information synchronization according to an embodiment of the present disclosure.

FIG. 16 is a schematic diagram illustrating interaction between service modules in the architecture for virtual resource information synchronization shown in FIG. 15.

In this embodiment, a process of synchronizing the virtual resource information of the tenant by the MANO system from the cloud platform includes the following operations.

1. In the operation process of the MANO system, the VNF service module sends a resource query request to the resource management module for inquiring resources of a certain tenant.
2. The resource management module sends the tenant and resource category information which are related to the request to the user behavior prediction module.
3. The user behavior prediction module executes a behavior prediction function, and if there is no externally injected prediction function, the user behavior prediction module uses a built-in default prediction function; and priority levels of resource queries on all tenants are initially the ordinary level. The specific rules (operations) are as follows:
3.1 recording the tenant, the resource category information, and a time point which are related to the current request;
3.2 if the number of resource queries on the tenant reaches a threshold (configurable, with a default value of 10) within a certain time interval (configurable, with a default value of 5 minutes), determining that the current user is interested in the resources of the tenant, raising the priority level of the resource queries on the tenant to the higher priority level, and recording this information;
3.3 if the number of the resource queries on the tenant does not reach the threshold (configurable, with the default value of 10) within a certain time interval (configurable, with the default value of 5 minutes), determining that the current user is not interested in the resources of the tenant, setting the priority level of the resource queries on the tenant to the common priority level, and recording this information;
3.4 if the condition in operation 3.2 is met, continuously checking the categories of the resources inquired by the user;
3.5 if the number of virtual machine resource query requests reaches a certain percentage (configurable, with a default value of 80%) of all query requests within the time interval, generating a task of full query of virtual machines on the tenant, raising a priority level of the task to the highest level, and recording this information; and
3.6 if the resource management module performs the task of full query of virtual machines after operation 3.5, then the information recorded in operation 3.5 is cleared.
4. The behavior prediction module sends the result of user behavior prediction to the policy update decision module.
5. The resource environment monitoring module executes monitoring functions regularly, and if there is no externally injected monitoring function, a default monitoring function is executed. The specific rules (operations) are as follows.
5.1 invoking each cloud platform to obtain a token interface, and recording a response time;
5.2 if the response time of a certain cloud platform exceeds 0.5 s, marking the cloud platform as a platform with poor performance, and recording this information; and
5.3 if the response time of a certain cloud platform is within 0.5 s, marking the platform as a normal platform, and recording this information.
6. The resource environment monitoring module sends the result of resource environment monitoring to the policy update decision module.
7. The policy update decision module obtains the resource synchronization policy according to the information obtained in operations 4 and 6, and the policy prompts the resource management module to immediately execute a resource synchronization task with the highest level in the cloud platforms, synchronize the resource information of the tenants having the higher priority level by taking 10 s (configurable) as an interval, and synchronize the resource information of the tenants having the common priority level by taking 2 minutes (configurable) as an interval; and meanwhile, an interval (configurable) is doubled for the platform with poor performance;
8. The updated-policy accuracy evaluation module queries the policy update decision module about the current policy, queries the resource management module about the resource requests sent by the VNF service module to the resource management module within a fixed time period (configurable, with a default value of 1 minute), and determines effectiveness of an updated policy according to an evaluation function. The evaluation function may be externally injected, and if there is no externally injected evaluation function, the rules of the evaluation function are as follows;
8.1 determining whether a tenant involved in the resource query requests within 1 minute is coincident with the tenant specified in the policy, determining that the updated policy is effective if the matching ratio is greater than 70% (a default value, configurable), determining to adjust the tenant having the higher priority level to a common tenant if the matching ratio is in a range of 50% to 70%, and determining to adjust the tenant having the higher priority level to a common tenant and cancel a request for the task with the highest priority level if the matching ratio is less than 50%.
9. The updated-policy accuracy evaluation module sends the evaluation conclusion to the policy update decision module, the policy update decision module adjusts the rules accordingly, and the specific adjustment scheme is described in operation 8.1.

It should be understood by those of ordinary skill in the art that the functional modules/units in all or some of the operations, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable storage medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM, an ROM, an EEPROM, a FLASH or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary implementations using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular implementation can be used alone or in combination with features, characteristics and/or elements described in connection with other implementations. Therefore, it should be understood by those of ordinary skill in the art that various changes in the forms and the details can be made without departing from the scope of the present disclosure of the appended claims.

What is claimed is:

1. A method for synchronizing virtual resource information, comprising:
    determining a resource synchronization policy characterizing a priority level of at least one tenant, wherein synchronization frequencies for synchronizing virtual resource information of tenants corresponding to different priority levels are different; and
    synchronizing virtual resource information of the at least one tenant according to the resource synchronization policy.

2. The method according to claim 1, wherein determining the resource synchronization policy comprises:
    predicting user operations targeting a tenant, and determining the priority level of the tenant according to a prediction result.

3. The method according to claim 2, wherein predicting the user operations targeting the tenant, and determining the priority level of the tenant according to the prediction result comprises:
    determining a query frequency of sending resource query requests by a Virtual Network Function (VNF), wherein the resource query requests are used for inquiring the virtual resource information of the tenant, and the query frequency characterizes the user operations targeting the tenant; and
    determining the priority level of the tenant according to the query frequency.

4. The method according to claim 3, wherein determining the priority level of the tenant according to the query frequency comprises:
    determining the priority level of the tenant as a first priority level in a case where the query frequency does not reach a first threshold; and
    determining the priority level of the tenant as a second priority level in a case where the query frequency reaches the first threshold,
    wherein a synchronization frequency corresponding to the first priority level is lower than a synchronization frequency corresponding to the second priority level.

5. The method according to claim 4, wherein determining the priority level of the tenant according to the query frequency further comprises:
    determining a first proportion in the case where the query frequency reaches the first threshold, the first proportion being a proportion of the resource query requests sent by the VNF to all query requests received within a first preset duration; and
    determining the priority level of the tenant as a third priority level in a case where the first proportion reaches a second threshold,
    wherein the synchronization frequency corresponding to the second priority level is lower than a synchronization frequency corresponding to the third priority level.

6. The method according to claim 3, wherein determining the resource synchronization policy comprises:
    acquiring response capability information of at least one cloud platform; and
    determining priority levels of tenants belonging to each cloud platform according to the response capability information of the at least one cloud platform.

7. The method according to claim 3, wherein determining the resource synchronization policy comprises:
    determining effectiveness information of the resource synchronization policy; and
    updating the resource synchronization policy according to the effectiveness information.

8. The method according to claim 2, wherein predicting the user operations targeting the tenant, and determining the priority level of the tenant according to the prediction result comprises:
    acquiring a user behavior prediction function; and
    predicting the user operations targeting the tenant according to the prediction function for determining the priority level of the tenant.

9. The method according to claim 8, wherein determining the resource synchronization policy comprises:
    acquiring response capability information of at least one cloud platform; and
    determining priority levels of tenants belonging to each cloud platform according to the response capability information of the at least one cloud platform.

10. The method according to claim 2, wherein determining the resource synchronization policy comprises:
    acquiring response capability information of at least one cloud platform; and
    determining priority levels of tenants belonging to each cloud platform according to the response capability information of the at least one cloud platform.

11. The method according to claim 2, wherein determining the resource synchronization policy comprises:
    determining effectiveness information of the resource synchronization policy; and
    updating the resource synchronization policy according to the effectiveness information.

12. The method according to claim 1, wherein determining the resource synchronization policy comprises:
    acquiring response capability information of at least one cloud platform; and
    determining priority levels of tenants belonging to each cloud platform according to the response capability information of the at least one cloud platform.

13. The method according to claim 12, wherein acquiring the response capability information of the at least one cloud platform comprises:
    invoking the cloud platform to obtain a token interface; and determining a response time of the cloud platform as the response capability information.

14. The method according to claim 13, wherein determining priority levels of tenants belonging to each cloud platform according to the response capability information of the at least one cloud platform comprises:

determining the priority level of each tenant belonging to a cloud platform as a fourth priority level in a case where the response time of the cloud platform exceeds a third threshold, wherein a synchronization frequency corresponding to the fourth priority level is lower than an original synchronization frequency of each tenant.

15. The method according to claim 1, wherein determining the resource synchronization policy comprises:

determining effectiveness information of the resource synchronization policy; and updating the resource synchronization policy according to the effectiveness information.

16. The method according to claim 15, wherein determining the effectiveness information of the resource synchronization policy comprises:

determining a matching ratio between tenants corresponding to resource query requests received within a second preset duration and tenants having the second priority level in the resource synchronization policy, so as to obtain the effectiveness information, wherein a synchronization frequency corresponding to the first priority level is lower than a synchronization frequency corresponding to the second priority level, and a synchronization frequency corresponding to the second priority level is lower than a synchronization frequency corresponding to the third priority level.

17. The method according to claim 16, wherein updating the resource synchronization policy according to the effectiveness information comprises:

determining the tenant having the second priority level to have the first priority level in a case where the coincidence rate is greater than a fourth threshold and less than a fifth threshold; and cancelling the tenant having the third priority level and determining the tenant having the second priority level to have the first priority level in a case where the coincidence rate is less than the fourth threshold.

18. An orchestrator, comprising:

one or more processors;

a memory having stored thereon one or more programs which, when executed by the one or more processors, cause the one or more processors to perform the method of claim 1; and one or more input/output (I/O) interfaces connected between the one or more processors and the memory and configured to enable information interaction between the one or more processors and the memory.

19. An electronic device, comprising:

one or more processors;

a memory having stored thereon one or more programs which, when executed by the one or more processors, cause the one or more processors to perform the method of claim 1; and one or more I/O interfaces connected between the one or more processors and the memory and configured to enable information interaction between the one or more processors and the memory.

20. A non-transitory computer-readable storage medium having stored thereon a computer program which, when executed by a processor, implements the method of claim 1.

* * * * *